United States Patent [19]
Kubokawa et al.

[11] Patent Number: 5,878,016
[45] Date of Patent: Mar. 2, 1999

[54] DISK CHANGER

[75] Inventors: Nobuyuki Kubokawa; Takao Higuchi; Ichiro Sakuma, all of Tokyo, Japan

[73] Assignee: Tokyo Pigeon Co., Ltd., Tokyo, Japan

[21] Appl. No.: 792,525

[22] Filed: Jan. 31, 1997

[30] Foreign Application Priority Data

Feb. 1, 1996 [JP] Japan ................................. 8-037046
Nov. 6, 1996 [JP] Japan ................................. 8-294259

[51] Int. Cl.⁶ ................................. G11B 17/04
[52] U.S. Cl. ................................. 369/178
[58] Field of Search ................. 369/34, 36, 38, 369/178, 191–192, 75.1–75.2, 77.1–77.2; 360/92, 99.06, 99.02

[56] References Cited

U.S. PATENT DOCUMENTS

| | | | |
|---|---|---|---|
| 5,123,001 | 6/1992 | Nakamichi et al. | 369/36 |
| 5,636,199 | 6/1997 | Ariyoshi et al. | 369/36 |
| 5,717,681 | 2/1998 | Osada | 369/36 |

FOREIGN PATENT DOCUMENTS

| | | |
|---|---|---|
| 0183856 | 6/1986 | European Pat. Off. . |
| 0492764 | 7/1992 | European Pat. Off. . |
| 0563927 | 10/1993 | European Pat. Off. . |
| 4-38657 | 2/1992 | Japan . |
| 4-121045 | 10/1992 | Japan . |

OTHER PUBLICATIONS

Austrian Search Report (May 19, 1998).
Austrian Examination Report (Apr. 14, 1998).

*Primary Examiner*—Allen T. Cao
*Attorney, Agent, or Firm*—Morgan, Lewis & Bockius LLP

[57] ABSTRACT

A disk changer includes a plurality of carriages having a disk on each carriage, a tray accommodating the plurality of carriages, the tray being reciprocated between a disk take-out position and a disk accommodating position, a recording and reproducing unit for driving a disk at a disk driving position for recording data thereon and reproducing data therefrom, a disk setting mechanism for displacing the disk when the disk is at a driving position from a disk loading level to a disk non-loading level and vice versa, a carriage lifting mechanism for vertically moving the carriage, which is at the disk accommodating position, between the lowermost level thereof and a level above the lowermost level, and for vertically moving the carriage between the non-loading level and a level above the non-loading level, and a carriage moving mechanism for moving the carriage to a space formed at one of the disk accommodating position and the disk driving position in association with an operation of the carriage lifting mechanism.

17 Claims, 15 Drawing Sheets

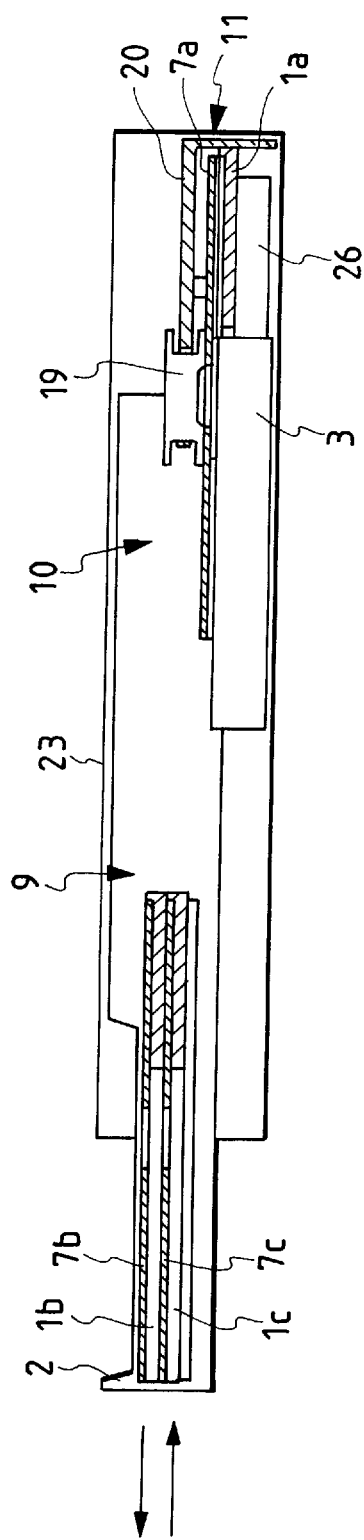
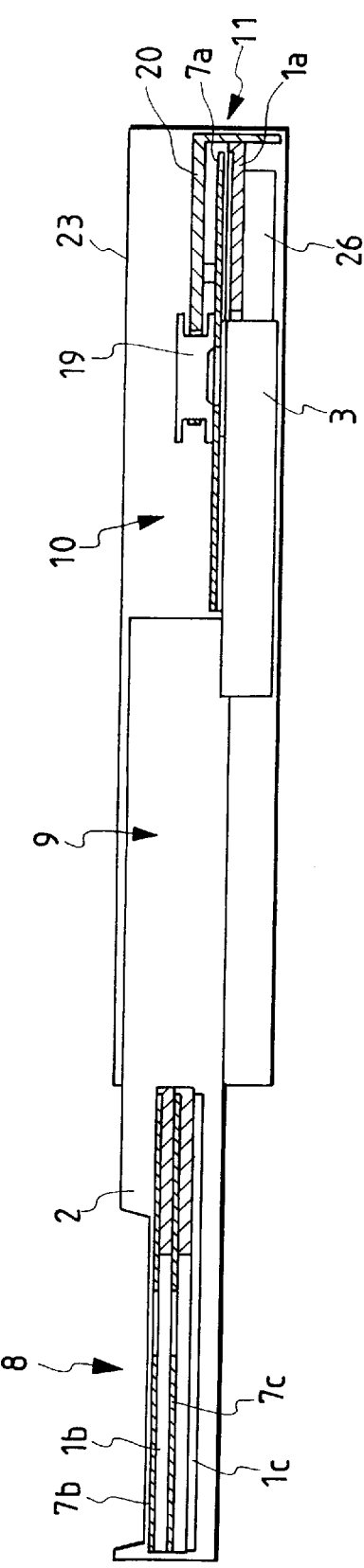

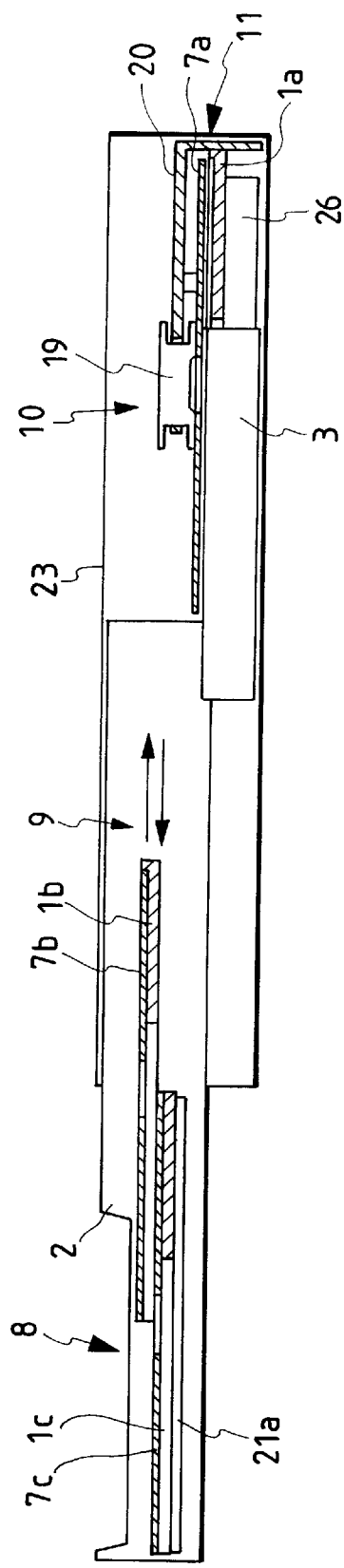
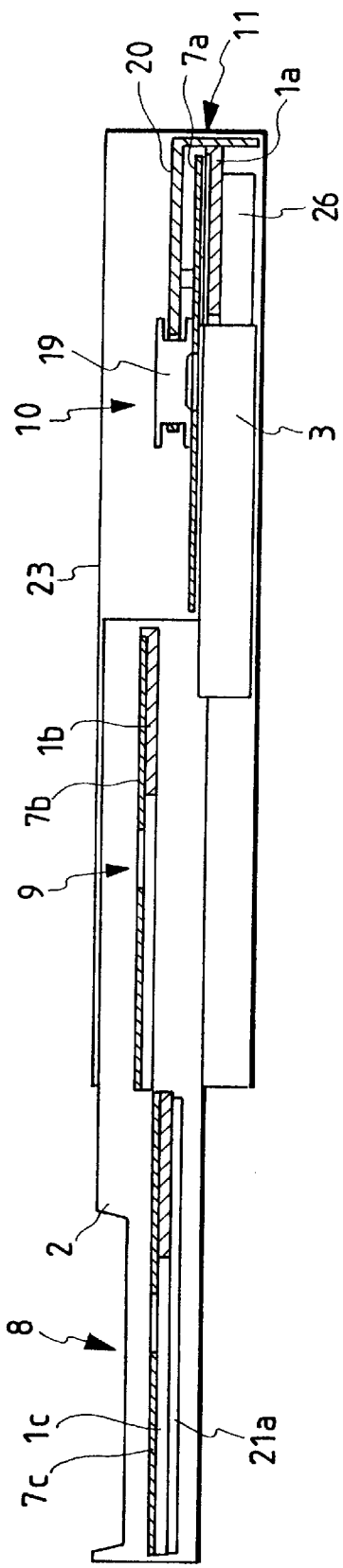

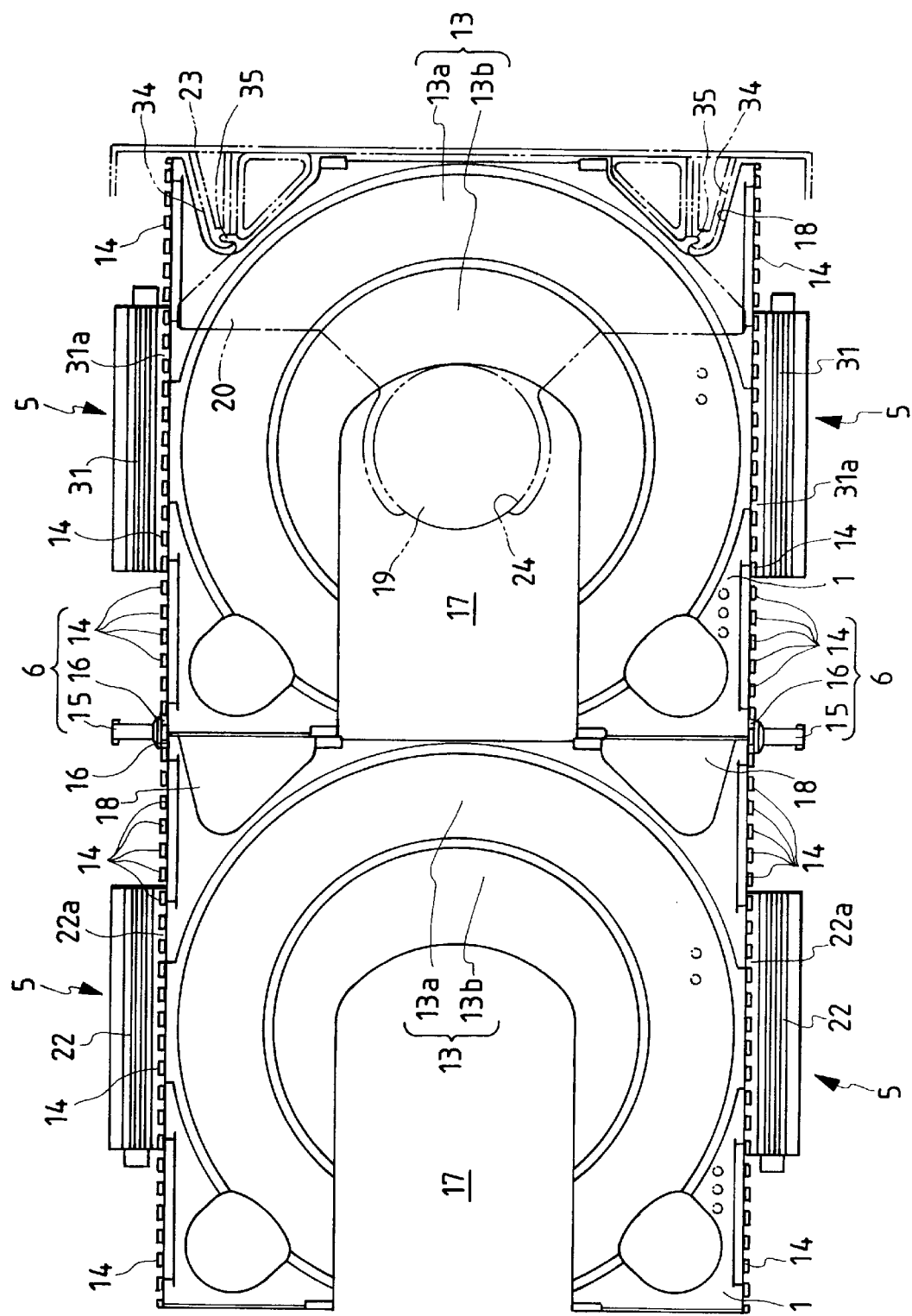

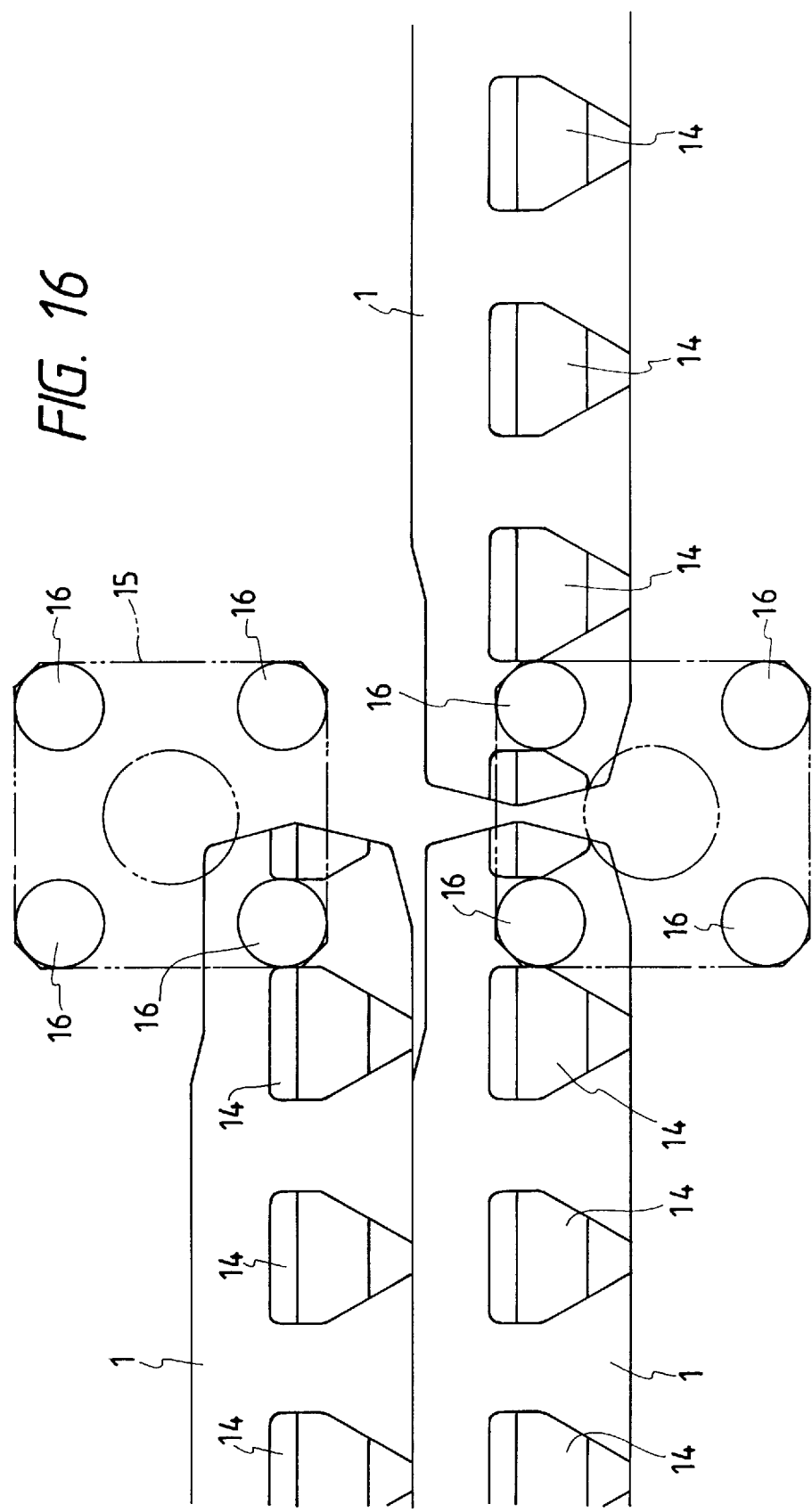

DISK CHANGER

BACKGROUND OF THE INVENTION

1. Field of the Invention

This invention relates to a disk changer in a device for recording data on and reproducing data from a disk-shaped recording medium such as a CD and a CD-ROM (hereinafter referred to merely as "a disk", when applicable) which disk changer accommodates a plurality of disks and automatically loads a selected disk in a disk driving section which includes a data recording and reproducing unit such as an optical pickup, and more particularly to a disk changer in which a plurality of disks are laid on carriages, and the disk which is being played is automatically replaced with another one by moving the carriages horizontally and vertically.

2. Related Art

A conventional disk changer which is simple in structure for loading and automatically exchanging three or four disks is shown in FIG. 29. That is, it has a rotary disk tray, and is called "a carrousel type disk changer (cf. Unexamind Japanese Utility Model Publication No. 121045/1992). The carrousel type disk changer operates as follows: A disk tray 101 on which a plurality of disks are set is turned to select one of the disks, and the disk thus selected is moved to a disk driving section which includes an optical pickup. In the upper surface of the disk tray 101, a plurality of recesses 102, 102 and 102 in each of which a disk placed are formed in such a manner that they are not overlapped with one another. At the disk reproducing position, the disk drive section (not shown) is moved vertically; that is, it is moved through a through-hole 103 formed in the recess 102 to hold the disk in cooperation with a clamper (not shown) which is arranged above the disk tray 101. In the disk changer, disk replacement is carried out as follows: While the disk driving section is held retracted below the disk tray 101, the disk tray 101 is turned to select a disk, and move it to the disk reproducing position.

In the carrousel type disk changer, a plurality of disks are loaded on one disk tray 101 in such a manner that they are not overlapped with one another as was described above. Hence, as the number of disks to be loaded on the disk tray 101 increases, the width and length (or external dimensions) of the device is increased; that is, the space occupied by the disk changer is increased. Even in the case where only three disks are loaded on one disk tray, both the width and length of the disk changer are each at least twice as long as the diameter of each disk, and the area is more than four times that of each disk.

In the case of the carrousel type disk changer, in order prevent the disk tray 101 from rubbing the chassis 104 of the disk changer body when the disk tray is turned, it is essential that the disk tray 101 in high in flatness, being free from a warp. In order to make the disk tray high enough in rigidity, or to make it free from a warp, the disk tray has reinforcing ribs, and accordingly its apparent thickness for height) is large.

On the other hand, the disk changer is so designed that the disk driving section including the optical pickup is moved up and down with respect to the disk. Therefore, it needs a mechanism for moving the disk driving section, and some space in the direction of height. As is apparent from the above description, the carrousel type disk changer in disadvantageous in that it is relatively large in width, length, and height.

In addition, in order that the disk tray 101 may be turned stably and smoothly on the chassis while being kept horizontal, the disk tay 101 is provided with supporting parts such as roller; that is the disk changer in large in the number of components, which results in an increase in the manufacturing cost.

For rationalization, the disk tray is formed as one unit by molding resin. Since it is a large molded product which is high in flatness, the resultant disk changer is high in manufacturing cost.

On the other hand, a cartridge type disk changer has been proposed in Japanese Unexamined Patent Publication Hei 4-38657; that is a plurality of disks are loaded therein in such a manner that they are stacked in a cartridge (or stocker). The cartridge type disk changer is advantageous in that at number of disks can be loaded therein when compared with the carrousel type disk changer; however, it is still disadvantageous in that, during reproduction, it is impossible to take out or replace the disk, because the disks are accommodated in the cartridge (or stocker) behind the pickup.

SUMMARY OF THE INVENTION

Accordingly, an object of the invention is to provide a disk changer which are smaller in width, length and height than a conventional disk changer and loads the same number of disks as the latter.

More specifically, an object of the invention is to provide a disk changer which, with about three disks loaded on the disk tray, is small in height, and small in size, and which is low in manufacturing cost and simple in structure.

Another object of the invention is to provide a disk changer in which, while data is being recorded to or reproduced from a first disk, a second disk which is not being recorded nor reproduced can be taken out or can be moved to replace a third disk not loaded in the disk changer.

The foregoing object of the invention has been achieved by the provision of a disk changer which comprises;

carriages on which disks are placed;

a tray which accommodates a plurality of said disks, and reciprocates between a disk take-out position and a disk accommodating position a recording and reproducing unit which drives a disk for recording data thereon and reproducing data therefrom;

a disk setting mechanism which moves vertically one of a plurality of said carriages and a disk thereon with respect to said recording and reproducing unit to a disk loading level or a disk non-loading level which is flush with the lowermost of said carriages at said disk accommodating position;

a carriage lifting mechanism which lifts said carriage which is at said disk accommodating position, between the lower and upper stages thereof, and lifts said carriage, which is at a disk driving position where said recording and reproducing unit in arranged, above said disk non-loading level of said disk setting mechanism; and a carriage moving mechanisms which, in association with the operation of said carriage lifting mechanism moves said carriage to a space which is formed at said disk accommodating position or said disk driving position.

In the case where the disk which is being recorded or reproduced is to be replaced with a selected one of the disk stored at the disk accommodating position or with a disk which is newly laid on the carriage at the disk take-out position from outside, the disk changer operates an follows: First, the disk setting mechanism is driven to lift the lowermost carriage at the disk driving position so that the disk which is being recorded or reproduced at the disk loading level is placed on the carriage thus lifted, and then the carriage and the disk are lifted to the disk non-loading level. At this point, a space corresponding at least one carriage is provided above the disk non-loading level at the disk driving position. Under this condition, the carriage lifting mechanism, and the carriage moving mechanism are driven, so that the carriages with the disks which are positioned at the disk accommodating position and at the disk driving position are moved to the aforementioned space one after another, while the space changes its position from the disk accommodating position to the disk driving position and vice versa. That is the utilization of the space corresponding to one carriage makes it possible to move the carriages one after another. And the carriage lifting mechanism and the carriage moving mechanism are driven in combination, so that the carriage on which the selected disk has been placed is set at the disk non-loading level at the disk driving position. In the final operating step, the disk setting mechanism is operated to move the carriage having the selected disk downwardly to the bottom at the disk driving position, while the selected disk on the carriage is clamped and loaded on the recording and reproducing unit at the disk loading position. Thus, the data recording or reproducing operation of the selected disk in started.

In the disk changer, the carriages are stacked and arranged on the side of the front of the device, while the disk driving mechanism is arranged in the inner part of the device. Hence, even when the data recording or reproducing operation of a disk is being carried out, the tray can be pulled out to replace the disk which is stored in front of the tray with the disk which is not loaded in the device.

BRIEF DESCRIPTION OF THE DRAWINGS

FIG. 1 is a sectional view showing the disk changer which is in a play mode in which, with a carriage and the lift moved downwardly by a clamper arm, a disk is placed on a recording and reproducing unit.

The part (A) of FIG. 13 is a sectional view showing another state of the disk changer in which a tray is being opened so that the disk be replaced with another one, and the part (B) is also a sectional view showing another state of the disk changer in which the tray has been closed for the same purpose.

The part (A) of FIG. 14 is a sectional view showing another state of the disk changer in which, with the tray opened, the upper carriage is being moved into the inner part of the tray so that the disk at the disk accommodating position is replaced with another with during reproduction; and the part (B) is also a sectional view showing another state of the disk changer in which the lower carriage is exposed.

Figure 17A:
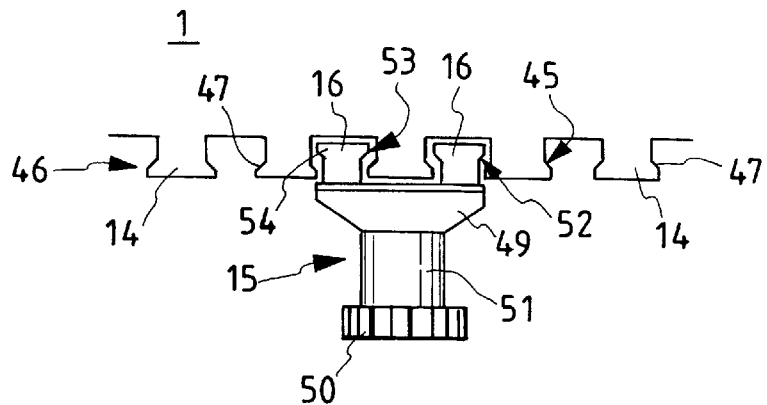
Figure 17B:
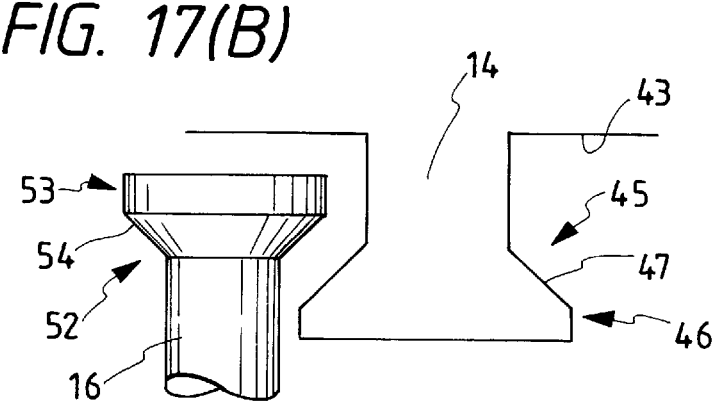

FIG. 15 is a plan view showing carriages, carriage lifting mechanisms, and carriage moving mechanisms in the disk changer of the invention, FIG. 16 is an explanatory diagram for a description of the relationship between a pin gear forming the carriage moving mechanism and teeth form along the side edges of the carriages FIG. 17(A) is a diagram showing a structure which prevents the pin gear from being disengaged from the teeth formed on the side edge of the carriage; and FIG. 17(B) is an enlarged diagram of a part of FIG. 17 (A).

Figure 18:
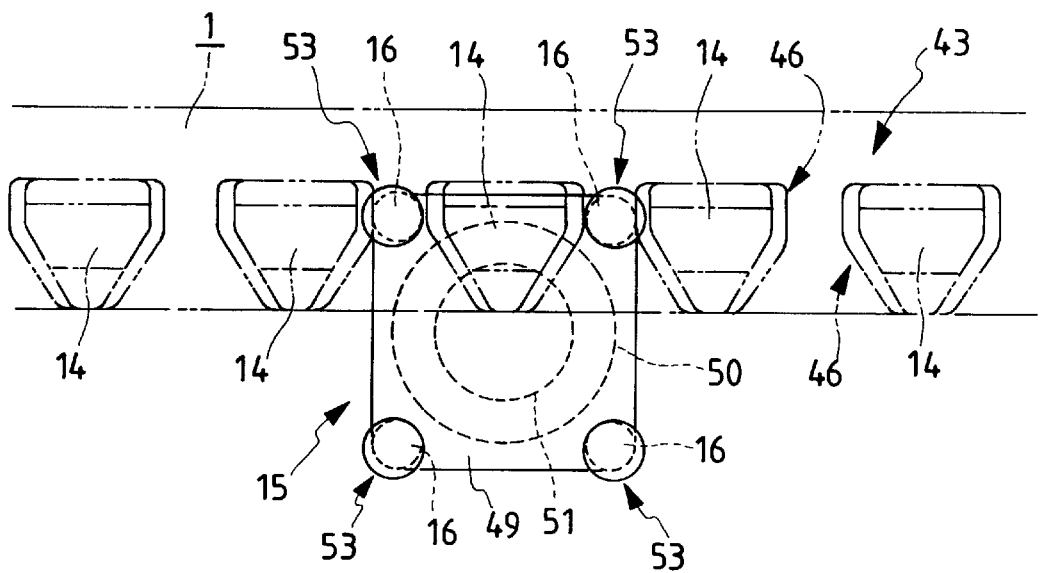

FIG. 18 is a side view for a description of a structure which prevent the pin gear front being disengaged from the teeth formed on the side edge of the carriage.

FIG. 19 outlines a disk setting mechanism.

Figure 19A:
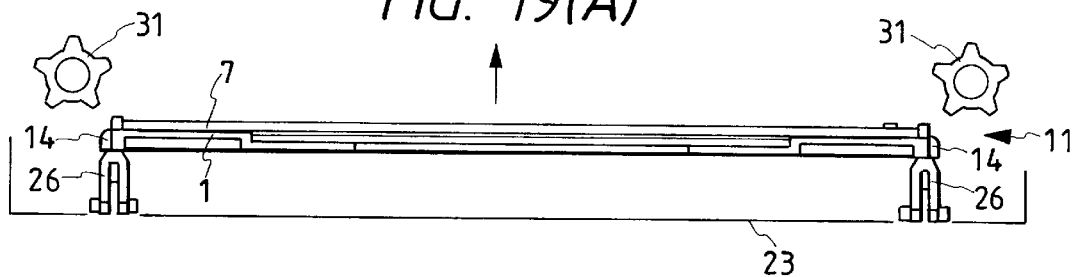

More specifically, FIG. 19(A) is a side view showing a state of the disk setting mechanism in which the carriage supported by lifters is set at a disk non-loading level.

Figure 19B:
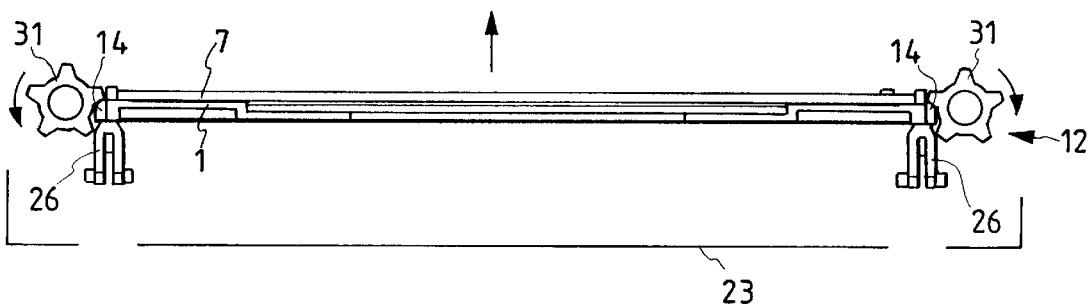

FIG. 19(B) is a side view showing another state of the disk setting mechanism in which the carriage has been raised by the lifters from the disk non-loading level to a level which is flush with the lower carriage at the disk accommodating section.

Figure 19C:
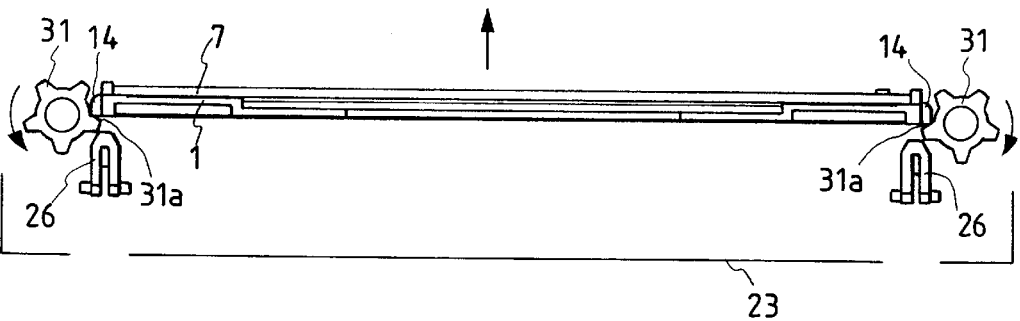

FIG. 19(C) is a side view showing another state of the disk setting mechanism in which the carriage which has been raised to the level which is flush with the lower carriage at the disk accommodating section, is being further raised by a star gear to an space above it.

Figure 19D:
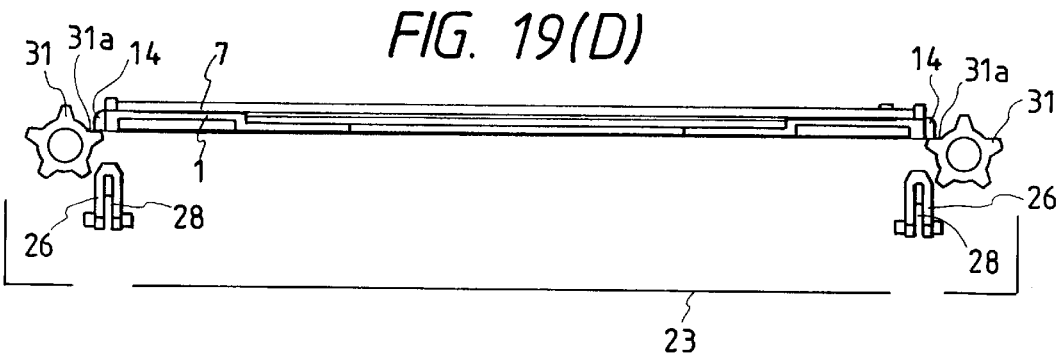

FIG. 19(D) is a side view showing another state of the disk setting mechanism in which the carriage which has been raised by the lifters to the level which is flush with the lower carriage at the disk accommodating section, has been further raised by the star gear to the space above it.

Figure 20:
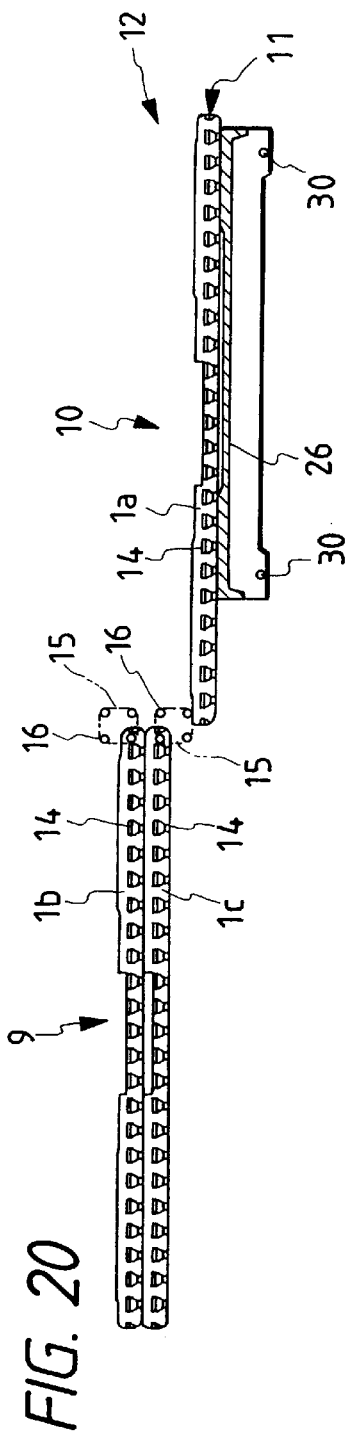

FIG. 20 is an explanatory diagram for a description of the movements of the carriages during disk replacement, showing the fact that the carriage accommodating the disk which is being reproduced has been moved to the disk loading level.

Figure 21:
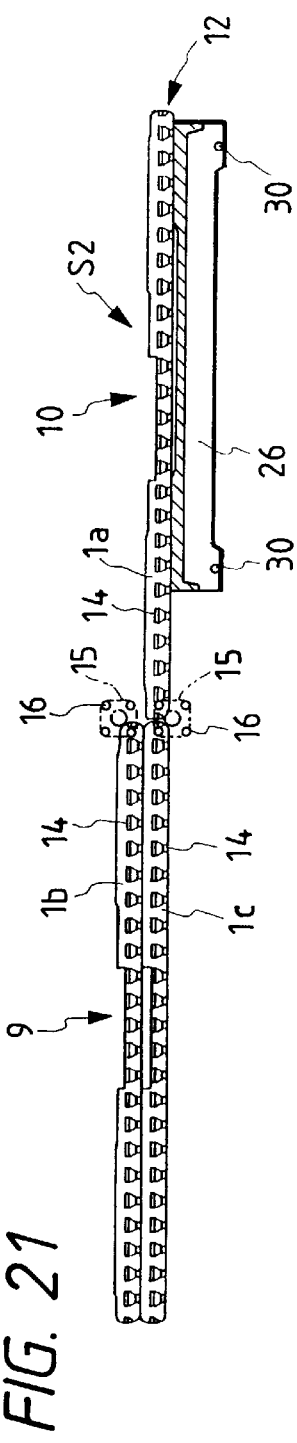

FIG. 21 is an explanatory diagram for a description of the movements of the carriages during disk replacement, showing the fact that, in order to replace the disk which is being reproduced, the carriage has moved from the disk loading level to the disk non-loading level.

Figure 22:
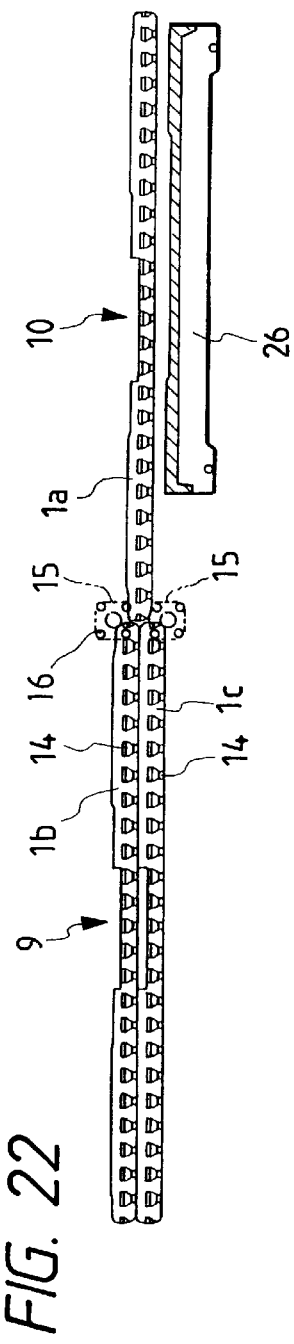

FIG. 22 is an explanatory diagram for a description of the movements of the carriages during disk replacement, showing the fact that the carriage in being moved to the upper space which accommodates the disk which has received from the recording and reproducing unit.

Figure 23:
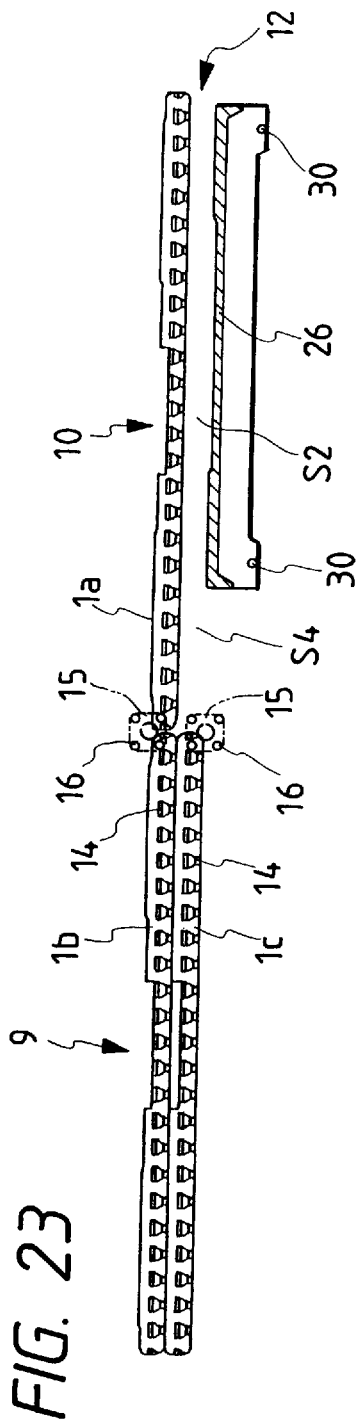

FIG. 23 is an explanatory diagram for a description of the movements of the carriages during disk replacement, showing the fact that the carriage is moved to the upper space which accommodates the disk which has received from the recording and reproducing unit, so that it is arranged at the same position as the upper carriage at the disk accommodating position.

Figure 24:
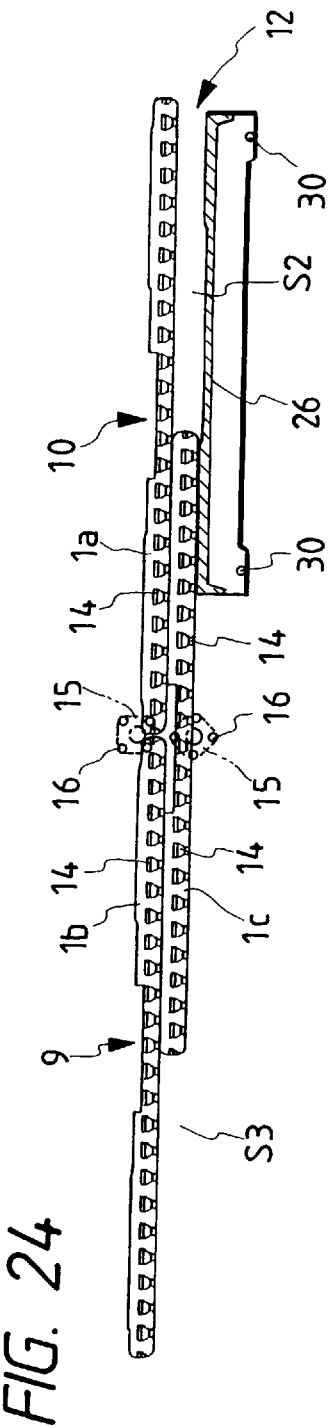

FIG. 24 is an explanatory diagram for a description of the movements of the carriages during disk replacement, showing the fact that the lower carriage at the disk accommodating position which accommodates a selected disk is moved into the space which is below the carriage which accommodates the disk which has received from the recording and reproducing unit.

Figure 25:
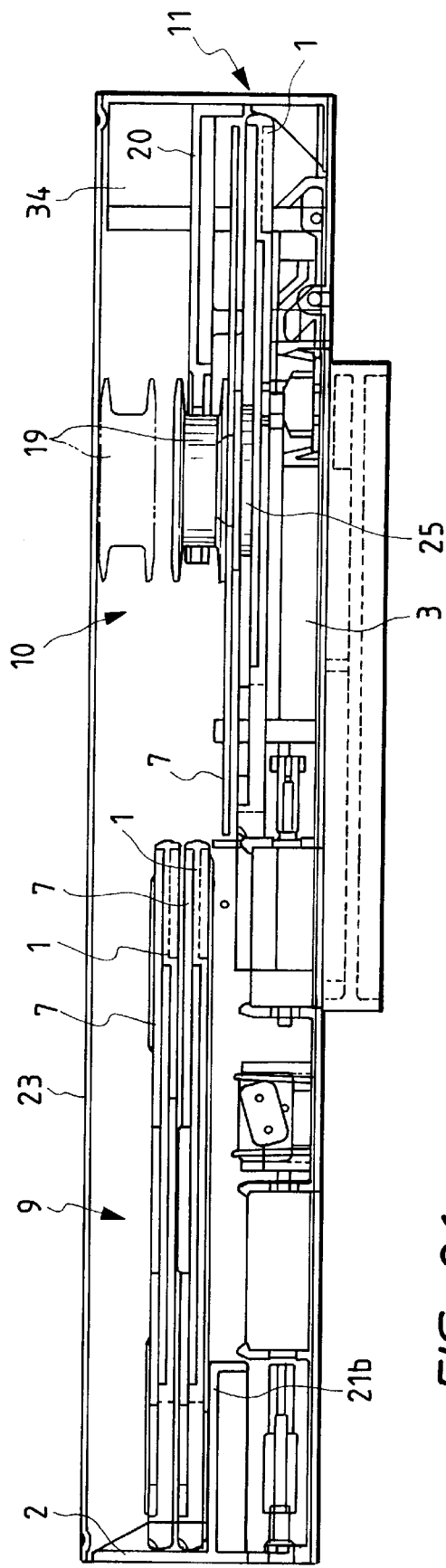

FIG. 25 is a longitudinal sectional diagram showing the disk changer according to the invention.

Figure 26:
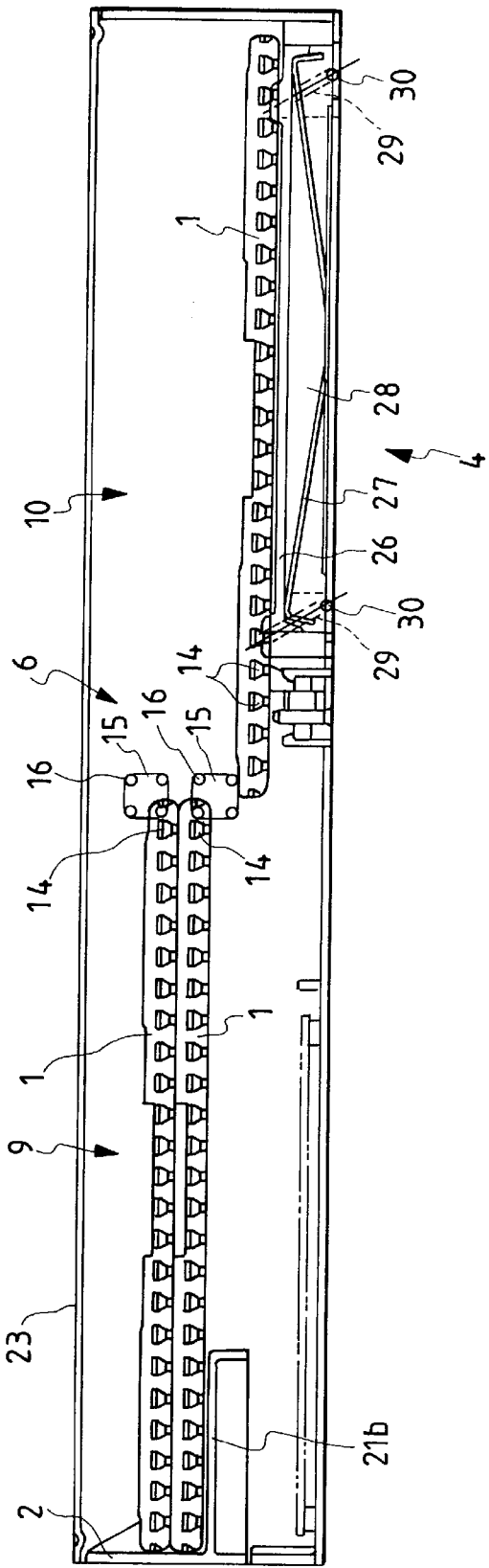

FIG. 26 is a sectional view showing the side edges of the carriages in the disk changer shown in FIG. 25.

Figure 27:
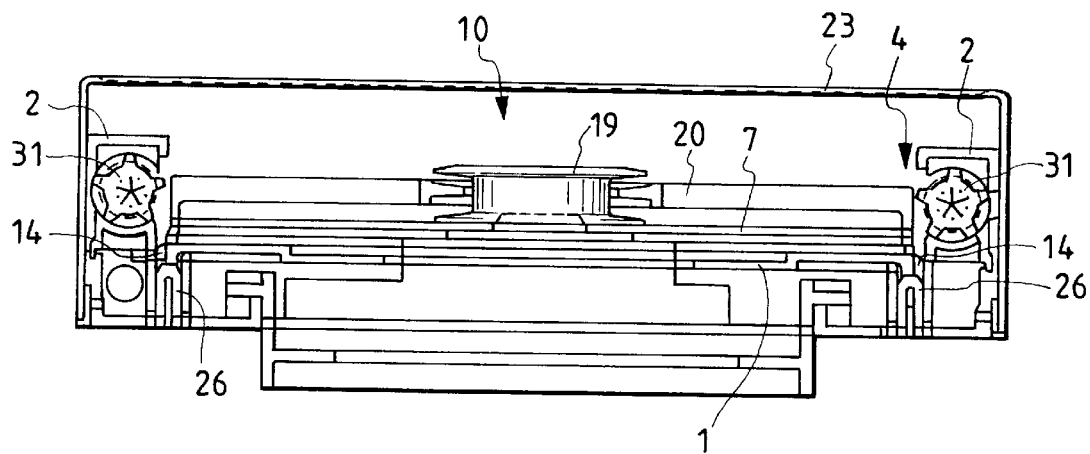

FIG. 27 is a cross sectional view taken at a disk driving position in the disk changer shown in FIG. 25.

Figure 28:
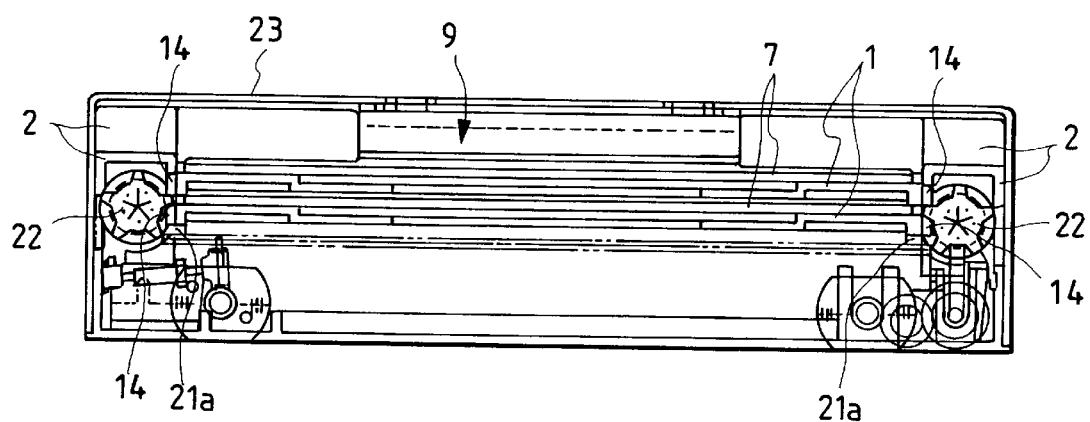

FIG. 28 is a cross sectional view taken at a disk accommodating section of tho disk changer shown in FIG. 25.

Figure 29:
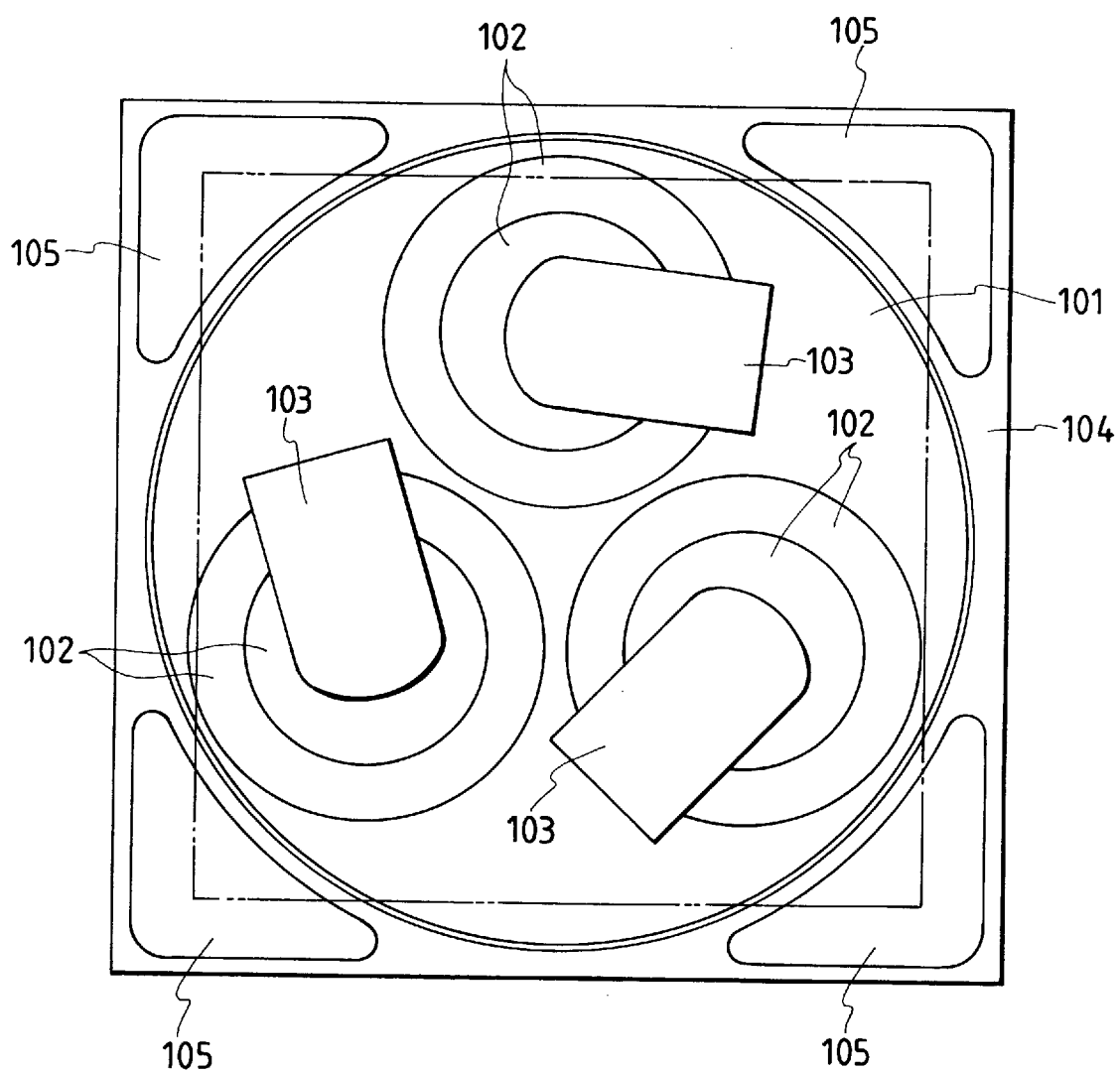

FIG. 29 is a plan view of a conventional three-disk type disk changer.

DETAILED DESCRIPTION OF THE PREFERRED EMBODIMENTS

A disk changer, which constitutes a preferred embodiment of the invention, will be described with reference to the accompanying drawings in detail.

FIGS. 1 through 28 shows a disk changer to which the technical concept of the invention is applied. In the disk changer, three disks are accommodated and are automatically exchanged with one another.

The disk changer comprises three carriages 1a, 1b and 1c on which disks 7a, 7b and 7c are set, respectively (the disks 7a, 7b and 7c are equivalent to one another although they are different in position, and the carriages 1a, 1b and 1c are also equivalent to one another although they are different in position, and therefore hereinafter the discs and carriages will be denoted by reference numeral 7 and 1, respectively, unless it is necessary to specify their positions); a tray 2 which accommodates two of the three carriages 1, and reciprocates between a disk take-out position 8 outside the device and a disk accommodating position 9 inside the device; a recording and reproducing unit 3 which is arranged at a disk driving position 10 which is located deeper than the disk accommodating position 9 in the device; a disk setting mechanism 4 which moves both a carriage 1 and a disk 7 on it up and down with respect to the recording and reproducing unit 3, to move the disk to a disk loading level 11 or a disk non-loading level 12 which is flush with the lower carriage 1 at the disk accommodating position 9; a carriage lifting mechanism 5 which moves the carriage 1, located at the disk accommodating position 9, up and down between the upper and lower positions thereof, and moves the carriage 1, which is located at the disk driving position 10, up and down between the disk non-loading level of the disk setting mechanism 4 and a level which is above the disk non-loading level 12 and is flush with the upper carriage located at the disk accommodating position 9; and a carriage moving mechanism 6 which, in response to the operation of the carriage lifting mechanism 5, moves the carriage to one of the spaces S1, S2, S3 and S4 which are formed at the disk accommodating position 9 or the disk driving position 10.

As shown in FIG. 15, the carriage 1 is made up of a plastic plate which is substantially square in a plan view, and has a recess section 13 at the center on which a disk 7 is placed for accommodation. The recess section 13 consists of a large-diameter recess 13a on which a 12-cm disk is placed, and a small-diameter recess 13b on which 8-cm disk is placed. Those recesses 13a and 13b are coaxially arranged. As shown in FIGS. 15 and 16, the carriage 1 has teeth 14 along its both edges which are extended in the direction of horizontal movement thereof. More specifically, the teeth 14 are arranged at certain intervals and protruded outwardly. The teeth 14 are in the form of a rack. The base portions of the teeth 14 are removed, to pass the pins 16 of a pin gear 15 vertically. Furthermore, the carriage 1 has a through-hole 17 which is extended from the center of the recess section 13 to one forward side of the device, to pass the recording and reproducing unit 3 including the optical pickup. In addition, the carriage has cuts 18 on both sides of the inner rear part of the device. The cut 18 is to pass the post of a clamper arm 20 which supports a clamper 19 which is located above the carriage 1. Owing to the arrangement of the post, the width of the clamper 20 may be substantially equal to that of the carriage 1, which makes it possible to make the external dimension of the disk changer substantially equal to that of two carriages 1. The carriages 1 are so arranged that two carriages 1 are stacked at the disk accommodating position 9, and one carriage 1 is set at the disk loading level 11 or the disk no-loading level 12 of the disk driving position 10.

The tray 2 accommodates two carriages 1, and is pulled out of the device or put back into the latter by means of a rotation transmitting system such as a rack mechanism and a driving motor; that is, it is reciprocated between the disk take-out position 8 and the disk accommodating position 9. The tray 2, as shown in FIG. 15, is provided with a pair of star gears 22, a pair of star gears 31, and a pair of pin gears 15, respectively, on both sides thereof as viewed longitudinally. More specifically, each star gear 22 is large in tooth width and provided on the forward side of the tray which corresponds to the disk accommodating position under the condition that the tray is accommodated in the device; and each star gear 31 is also large in tooth width, and provided on the side of the inner part of the tray which corresponds to the disk driving position 10; and each pin gear 15 is provided along the border line between the disk accommodating position 9 and the disk driving position 10. Furthermore, the tray 2, as shown in FIGS. 25 and 28, has side portion receiving stands 21a which support the edge of the lower of the two carriages 1 and 1 at the disk accommodating position 9, and a front portion receiving stand 21b which supports the front edge of the carriage 1. The two carriages 1 and 1 stacked are supported independently of each other; that is, the lower one 1 is supported by the receiving stands 21a and 21b, and the upper one is supported by the star gears 22. Hence, the two carriages 1 and 1 can be moved independently of each other.

When the tray 2 is pulled out of the device no that the two carriages 1 and 1 stacked at the desk accommodating position 9 are moved to the disk take-out position 8, then the disk 7 on the upper carriage 1 can be replaced with another disk. When only the upper carriage 1 is pulled into the device by turning the pin gear 15, then the disk 7 on the lower carriage 1 is exposed so that it can be replaced. The horizontal movement of the upper carriage 1 into the inner part of the device is carried out with the teeth 22a and 31a of the star gears 22 and 31 as rails.

On the other hand, the recording and reproducing unit 3 including the optical pickup is provided at the center portion of the carriage 1 at the disk driving position 10 in backward side of the device. The recording and reproducing unit 3 is fixedly secured to a device frame 23. Loading or unloading a disk 7 is achieved when the carriage 1 on which a disk 7 is placed, and the clamper 19 are moved vertically.

The damper 19 adapted to fix the disk 7 to the recording and reproducing unit 3 is, for instance, in the form of a cylinder having flanges on both of upper and lower ends. The clamper 19 in supported by a relatively large C-shaped hole farmed in the end portion of the clamper arm 20 by utilizing the upper and lower flanges, in such a manner that it is slightly movable both horizontally and vertically. The clapper arm 20 is moved up and down by at driving motor (not shown). The clamper arm 20, as shown in FIGS. 15 and 25, is guided by the guide ribs 35 of the clamper supporting arm 20 engaging guide rails 34 arranged on both sides of the device frame so that it 20 can move vertically. When the disk 7 is lowered to the disk loading level 11, the clamper arm 20 is abutted against both side edges of the carriage 1, which are along the direction of planar movement of the latter 1. And the clamper arm 20 is supported by a lifter 26 at the disk non-loading level 12, so that the lifter 26 and the carriage 1 are further lowered. In this operation, the central hole of the disk 7 is engaged with the hub 25 of the recording and reproducing unit 3, and the disk 7 is fixedly held between the clamper 19 and the hub 25. The damper 19 has an iron member so that it is attracted by a magnet burled in the hub 25 of the recording and reproducing unit 3. Hence, the disk 7 is positively clamped by the hub 25 and the clamper 19 which is attracted by the latter 25. It goes without saying that, depending on the structure of the recording and reproducing unit, the clamper 19 may have the magnet while the hub 25 the iron member.

A return spring 27 to push up the lifter 26 is provided between the lifter 26 and the device frame 23. The spring 27 in substantially V-shaped, and its both ends are engaged with a groove 28 formed in the lift 26, while its central portion in pushed against the bottom of the device frame 23. On the other hand, the lifter 26 has guide pins 30 at both ends, which are engaged with inclined guide grooves 29 formed in the device frame 23. Hence, when pushed up by the spring 27, and pushed down by the clamper arm 20, the lifter 26 is moved up and down while being held horizontally as a whole. The lifter 26, the clamper arm 20, and the return spring 27 form a disk setting mechanism 4.

The carriage lifting mechanism 5 comprises star gears 22 and 32 which are large in tooth width and are located respectively in the front part and in the inner part of the tray 21 and a drive source (not shown) for turning those star gears 22 and 31. The tooth width of each of the star gears 22 and 31 in the direction of axis of rotation is approximately half of the length of the carriage 1. The star gears 22 and 31 are provided respectively on both sides of the carriage 1 which are along the planar movement direction. The carriage 1 is disposed between the star gears 22 and 22 or 31 and 31, and supported by the other gears 22 and 31, specifically, teeth 14 which are provided on said both sides of the carriage 1 and formed integrally with the latter 1 are mounted on the teeth of the star gears 22 and 22 or 31 and 31. The carriage 1 is moved upwardly or downwardly as the star gears 22 and 31 turn (cf. the parts (A) through (D) of FIG. 19). The star gears 22 and 31 support the carriages 1 and 1 at the middle of both sides along the planar movement direction locus of the latter 1 when they are located respectively at the disk accommodating position 9 and the disk driving position 10. Moreover, the star gears 22 and 31 are so designed that they are turned independently of each other (cf. FIG. 15).

The star gears 22 and 31 may be so modified that gears are arranged at predetermined intervals in the direction of axis of rotation. The modification has functions which are substantially equal to those which are obtained in the case where, as was described above, the tooth width is approximately half of the length of the carriage 1.

The carriage moving mechanism 6 is provided in the tray 2, and comprises; the upper mechanism which horizontally moves the carriage 1 in the upper horizontal plane; and the lower mechanism which horizontally moves the carriage in the lower horizontal plane which is flush with the disk non-loading level 12. The upper mechanism comprises: the star gears 22 and 31 which are arranged respectively in the front part and in the inner part of the tray 2; and the pin gears 15 located between those star gears. The pins 16 of the pin gears 15 are engaged with the teeth 14 on both sides of the carriage 1. When the pin gears 15 turn, the carriage 1 is slid over the teeth of the star gears 22 and 31 so as to move between the spaces 51 and S2. On the other hand, the lower mechanism is to move the carriage between the spaces S3 and S4. In the lower mechanism, the carriage is not slid over the teeth of the star gears, and instead it is slid over the receiving stands 21a on both sides of the tray 2 and the supporting portion which is the upper end of the lifter 26. The other arrangement and operations of the lower mechanism are equal to those of the upper mechanism.

The structure of the pin gear 15 of the carriage moving mechanism 6, and that of the teeth 14 of the carriage 1 will be described in more detail.

When the disk loaded in the device is replaced with a disk which is not accommodated therein, an unwanted force may be applied to the carriage 1 in order to place the disk on the latter 1, or the tray 2 may be hitted accidentally with an article when is is opened; that is, an external force is directly applied to the carriage 1. In this case, the carriage 1 is horizontally shifted so that the teeth 14 of the carriage 1 are shifted in engagement from the pins 16 of the pin gear 15 at worst the former may be disengaged from the latter. In the embodiment, this difficulty is eliminated as follows;

As shown in FIGS. 17 and 18, each of the teeth 14 protruded from the side surfaces of the carriage 1 has a flange 46 at the end which is in parallel with the side surface. The flanges 46 do not protrude on the sides of the upper surface and the lower surface (the slide surface) of the carriage 1; that is, they are protruded only in the direction of slide of the carriage. In other words, they are protruded between adjacent teeth 14 and 14 in such a manner that they are adjacent to each other. However, as long as the teeth 14 of the carriage 1 are in engagement with the pins 16 of the pin gear 15, each flange 46 may be so formed that it surrounds the end portion of the respective tooth 14.

The inner surface 45 of each flange 46 which is confronted with the side surface 43 of the carriage 1 has a sloped surface 47 which in inclined in such a manner that it is gradually smaller in thickness towards the outer edge. The sloped surface 41 is to draw in the pin 16 which is abutted against it. As long as the flange 46 has the sloped surface, the thickness of the flange 46 is not particularly limited.

The pin gear 15 comprises: a rotary board 49 having a plurality of pins 16 which are equal in configuration to one another and protruded in parallel with the axis of rotation; and a pinion 50 which is integral with the rotary board 49 directly or through a supporting shaft 51. In the embodiment, the rotary board is substantially square, and the supporting shaft 51 is provided at the center of the rotary board, and four cylindrical pins 16 are provided respectively at four corners of the rotary board 49. However, in the invention, the configuration of the rotary board, and the number of pins are not limited as long as the pins are engaged with the teeth 14 of the carriage 1 to slide the latter 1.

Each of the pins 16 has a flange 53 at the end, and the flange 53 has a sloped surface 54 which is confronted with the sloped surface 47 of the teeth 14. As shown in FIG. 18. The pin 16 has no flange 53 at its portion which is not engaged with the teeth 14. However, similarly as in the case of the teeth 14, the flange 53 may be so formed that it surrounds the and portion of the pin 16.

When the carriage 1 is driven, the flanges 46 of the teeth 14 may strike against the flanges 53 of the pins 16, thus interrupting the rotation. In order to prevent the interruption the outer end surface of the flange 46, which does not confront with the side surface 43, and the end surface of the flange 53, which confronts with the side surface 43, may have sloped surfaces, respectively.

The pin gear 15 and the carriage 1 are arranged as follows: That is, they are engaged with each other in such a manner that the pins 16 and the teeth 14 are protruded parallel. In order to transfer the torque of the pin gear 15 effectively to glide the carriage, the slide surface of the carriage 1 is somewhat (radially outwardly) shifted from the center of rotation of the rotary board 49.

With the pin gear 15 and the carriage teeth 14 in the carriage moving mechanism 6 thus designed, the carriage 1 is slide as follows.

At least one pin 16 is kept engaged with a tooth 14 of the carriage 1 at all times. Hence, when the pin gear 15 engaged with the side surface 43 of the carriage 1 is turned, the torque of the pin gear is transmitted through the pin 16 to the tooth 14 which is in parallel with and in abutment with the latter 16. As a result, the torque serves as an energizing force which slides the carriage to the right or to the left in FIG. 18, or towards the front or rear of the device.

In this case, the flange 53 of the pin 16 is located in the gap between the adjacent teeth 14, thus not affecting the rotation of the pin gear 15 at all. On the other hand, in the case where an external force in applied to move the carriage horizontally, the flanges 46 of the teeth 14 abut against the flanges 53 of the pine 16, so that the movement of the teeth with respect to the pins, or the movement of pins with respect to the teeth, is limited to some extent. Accordingly, the teeth 14 of the carriage 1 and the pins 16 of the pin gear will never disengaged from each other.

The surfaces 45 and 52 of the flange 46 and 53, which are confronted with each other, include the sloped surfaces 4, and 54, respectively. Hence, when an external force is applied in such a manner as to move the teeth 14 and the pins 16 away from each other those sloped surfaces 47 and 54 act to cause the flanges 47 and 53 to pull each other. Therefore, even in the case when the engagement of the teeth 14 of the carriage 1 with the pins 16 of the pin gear 15 is insufficient, the sloped surfaces 46 and 54 of the flanges 45 and 53 guide the respective flanges to a suitable engagement position; that is the teeth 14 and the pins 16 are sufficiently engaged with each other at all times. In addition, the device is free from the difficulty that the flange. Of the teeth 14 of the carriage 1 and the pins 16 of the pin gear 15, when turned or slid, are struck against each other to obstruct the engagement of them. That is, in the device, the carriage 1 is smoothly moved.

In the above-described embodiment, the flanges of the teeth and the pins have the sloped surfaces; however, the invention is not limited thereto or thereby. That is, as long as the flanges of the teeth have the sloped surfaces, the flanges of the pins may not have the sloped surfaces; and vice versa.

Furthermore, in the above-described carriage moving mechanism, the pin gears 15 are provided on both sides of the tray 2, and driven on both sides of the carriage 1; however the pin gear 15 may be provided on only one side of the tray 2 if a drive force is obtained which is high enough to smoothly slide the carriage 1. However, it should be noted that, if the pin gears are provided on both sides of the tray and are driven in synchronization with each other, then the carriage thus driven is more positively slid, and providers a great drag against a horizontal external force.

The lower carriage mechanism 6 has been described in the above by way of example. In the lower carriage mechanism 6, the pin gear is engaged with the teeth of the carriage from below (on the side of the slide surface); while in the upper carriage mechanism 6, the pin gear 15 is engaged with the teeth of the carriage from above (cf, FIG. 16). The other arrangements of the upper carriage mechanism 6 are equal to those of the lower carriage mechanism.

The disk changer thus constructed operates as follows: It is assumed that the disk changer is applied to a musical sound reproducing CD player.

First, replacement of a disk to be reproduced will be described with reference to FIGS. 1 through 12, In FIG. 1, the player is in a play mode. In the play mode, at the disk loading level 11 of the disk driving position 10, the first disk 7a is ready for play, being clamped onto the hub 25 of the recording and reproducing unit 3, and the first carriage 1a is located below it. On the other hand, the second and third disks 7b and 7c are accommodated in the carriages 1b and 1c, respectively, and are stacked (stored) at the disk accommodating position 9 on the side of the front of the device (the player). In the case where, when the player is in the above-described play mode, it is required to replace the first disk 7a at the disk loading level 11 with a selected one of the remaining disks 7b and 7c at the disk accommodating position 9, the disk changer operates as follows:

The replacement of the first disk with the second disk 7b, which is the upper disk at the disk accommodating position, is started by depressing a disk select key [DISK 2] (not shown) of the device. First, the lifter 26 and clamper 19 are lifted to release the first disk 7a, while the carriage 1a is raised to the disk non-loading level 12 which is flush with the third carriage 1c. The clamper 19 is lifted by the clamper arm 20 driven by the motor, and the lifter 26 is lifted by the elastic force of the return spring 27. Thus, the first disk 7a has been left from the hub 25, and then placed on the carriage 1a (of FIG. 2).

Next, the clamper 19 is further lifted, thus reaching its uppermost position. Now, the player is placed in a change mode (of FIG. 3). That is, the upper carriage moving mechanism 6 is driven. As a result, the second carriage 1b, on which the second dick 7b thus selected is placed, is horizontally moved from the upper stage at the disk accommodating position 9 in the tray 2, which is located on the side of the front of the device, towards a space 52 at the disk driving position 10, which is located in the inner part of the device (of FIG. 4) and laid on the first carriage 1a at the disk non-loading level 12 which accommodates the first disk 7a (of FIG. 5).

Thereafter, the carriage lifting mechanism 5 on the side of the disk accommodating position 9; that is, the star gear 22 is driven. AS a result, the third carriage 1c is lifted into a space S1 which is formed by the movement of the carriage 1b (of FIG. 6), thus becoming flush with the second carriage 1b (of FIG. 7). The lower carriage moving mechanism 6 is further driven, so that the first carriage 1a is moved into the space S3 formed on the lower stage of the disk accommodating position 9, which is located on the side of the front of the device (of FIG. 9), and comes below the third carriage 1c (of FIG. 9). And the carriage lifting mechanism 5 on the side of the disk driving position 10; that is, the star gear 31 is driven, so that the second carriage 1b at the disk driving position 10 starts moving down towards a space S4 (of FIG. 10) until it becomes flush with the disk non-loading level 12 which is flush with the first carriage 1a (of FIG. 11). Thus, the change mods has been ended.

Figure 12:
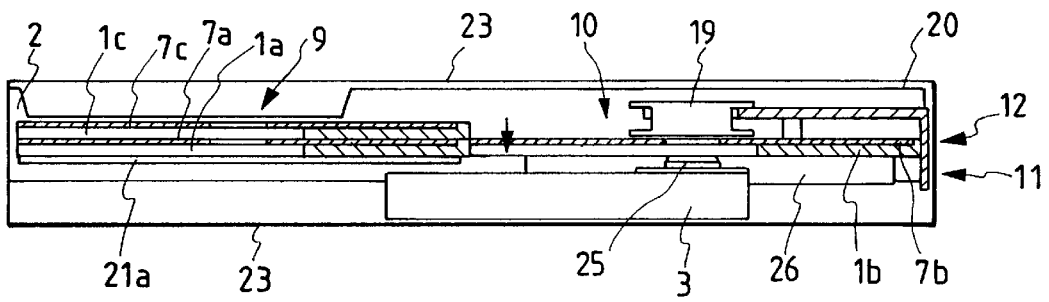
FIG. 12 is a sectional view showing another state of the disk changer in which, with the clamper arm moved downwardly, the clamper is being moved towards the recording and reproducing unit.

Thereafter, when the clamper arm 20 is moved downwardly, the clamper 19 is also moved downwardly, and the lifter 26 is pushed downwardly (of FIG. 12).

As a result, the second carriage 1b supported by the lifter 26 is moved downwardly, and the clamper 19 clamps the second disk 7b onto the hub 25 so that the second disk 7b is ready to be driven. Thus, the player is placed in the play mode again, and the replacement of the disk has been accomplished. In other words, from FIG. 1 to FIG. 12, the carriages are turned clockwise. More specifically, the second disk 7b is placed at the position where the first disk 7a was; that is, the first disk 7a is replaced with the second disk 7b; at the same time, the third disk 7c is placed at the position where the second disk 7b was; that is, the second disk 7b is replaced with the third disk 7c; and the first disk 7a is placed at the position where the third disk 7c was; that is, the third disk 7c is replaced with the first disk 7a. Thus, the replacement of the disks has been accomplished.

Next, the replacement of the first disk 7a at the disk loading level 11 with the third disk 7c which is located on the lower stage at the disk accommodating position 9 is started by depressing a disk select key [DISK3] (not shown) on the device, similarly as in the above-described case, In this case, until the player is placed in the change mode (FIGS. 1, 2 and 3), it is operated similarly as in the case where the disk select key [DISK2] has been depressed. Thereafter, the carriage lifting mechanism 5 and the carriage moving mechanism 6 are driven in the directions opposite to the directions in which they are driven in the case of the depression of the disk select key [DISK2], so that the carriages are turned counterclockwise. Those operations will be described with reference to FIGS. 20 through 24 while being compared with those described with reference to FIGS. 1 through 12. FIGS. 20 through 24 show relationships between the carriages and the carriage moving mechanisms (or the pin gears).

Figure 1:
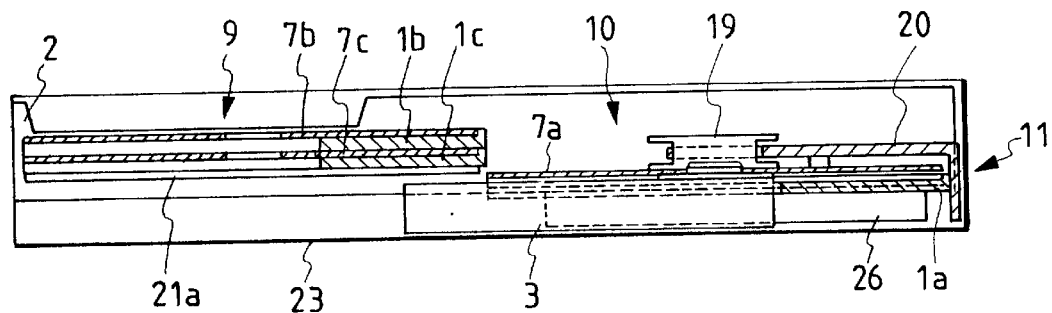
FIG. 1 is a diagram outlining a disk changer, which constitutes a preferred embodiment of the invention. More specifically
Figure 2:
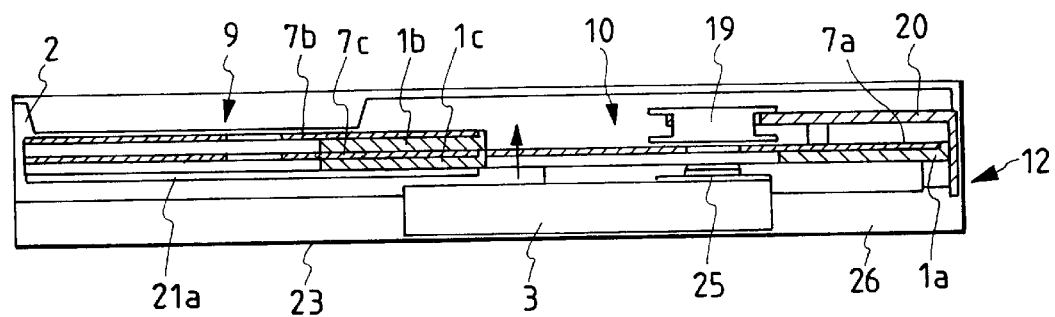
FIG. 2 is a sectional view showing a state of the disk changer in which a disk is being taken out of the recording and reproducing unit so that it be replaced with another one.
Figure 3:
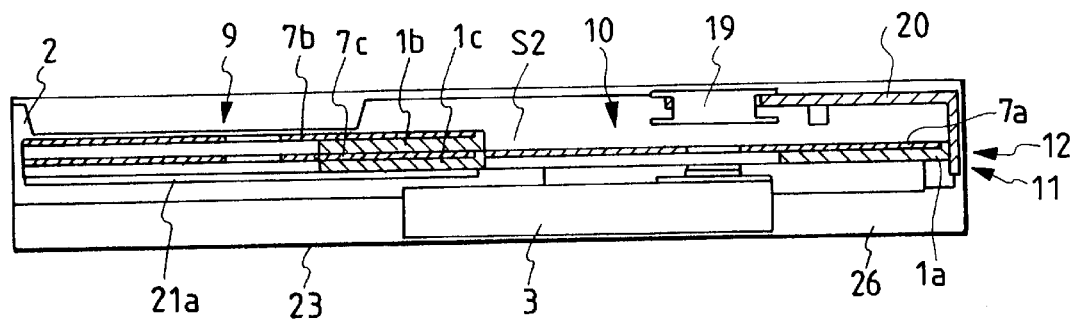
FIG. 3 is a sectional view showing another state of the disk changer in which the disk has been taken out of the recording and reproducing unit so that it be replaced with another one.
Figure 4:
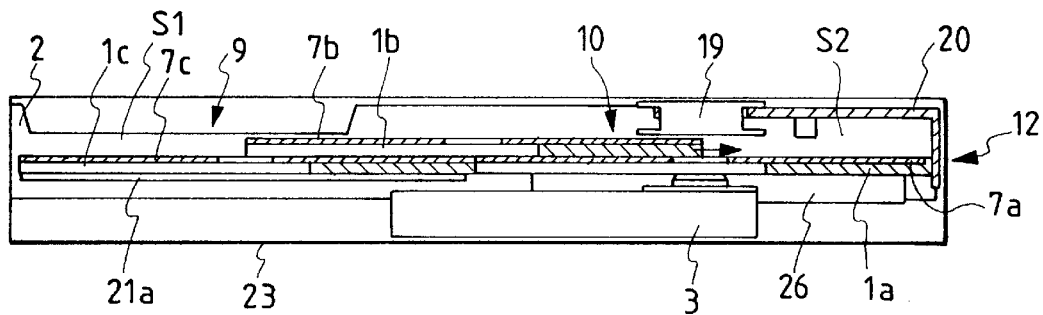
FIG. 4 is a sectional view showing another state of the disk changer in which a carriage Is being moved from a disk accommodating position to a disk driving position so that the disk be replaced with another one.
Figure 5:
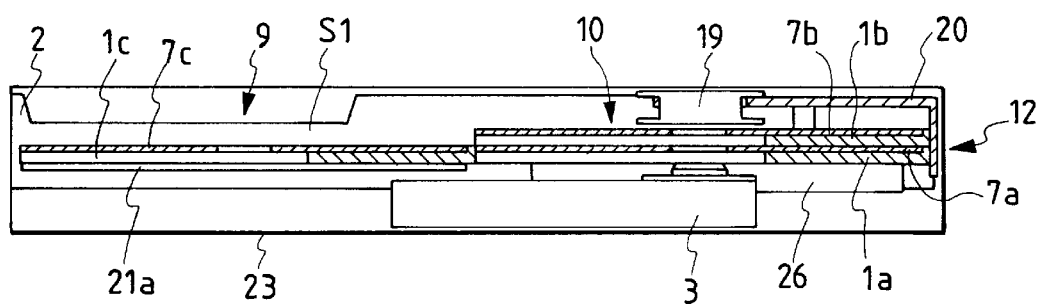
FIG. 5 is a sectional view showing another state of the disk changer in which the carriage has been moved from the disk accommodating position to the disk driving position so that the disk be replaced with another one.
Figure 6:
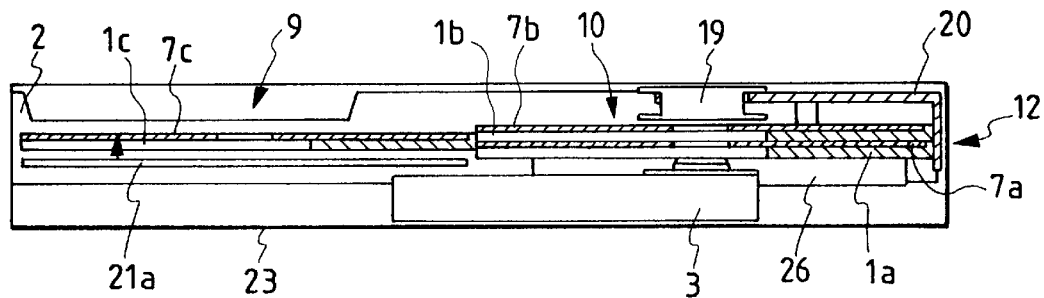
FIG. 6 is a sectional view showing another state of the disk changer in which the lower carriage at the disk accommodating position is being moved into a spaced formed above it so that the disk be replaced with another one.
Figure 7:
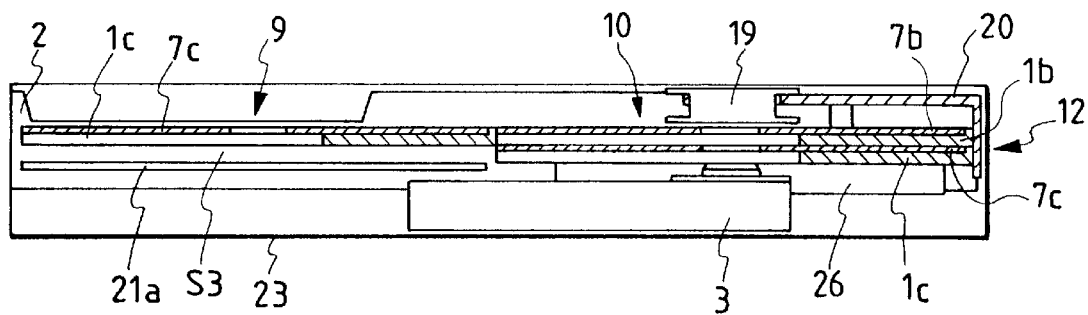
FIG. 7 is a sectional view showing another state of the disk changer in which the lower carriage at the disk accommodating position has been moved into the space formed above it so that the disk be replaced with another one.
Figure 8:
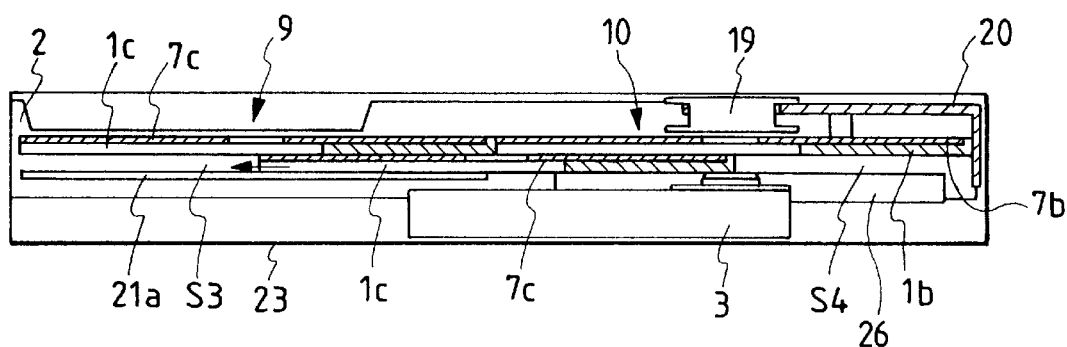
FIG. 8 is a sectional view showing another state of the disk changer in which the carriage which accommodates the disk which has been mounted on the recording and reproducing unit is being moved from the disk driving position to the disk accommodating position so that the disk be replaced with another one.
Figure 9:
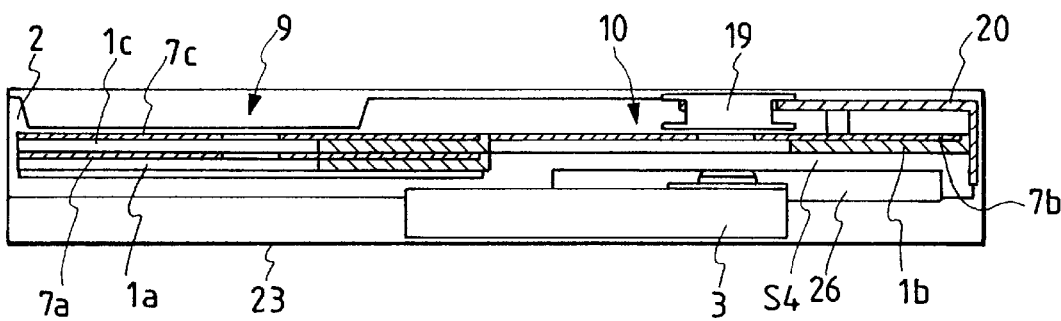
FIG. 9 in a sectional view showing another state of the disk changer in which the carriage which accommodates the disk which has been mounted on the recording and reproducing unit has been moved from the disk driving position to the disk accommodating position so that the disk be replaced with another one.
Figure 10:
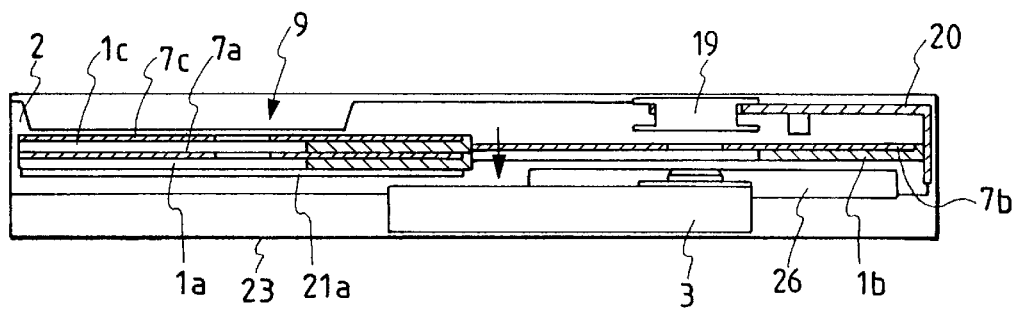
FIG. 10 is a sectional view showing another state of the disk changer in which the carriage which accommodates a selected disk is being moved into a spaced formed above the recording and reproducing unit.
Figure 11:
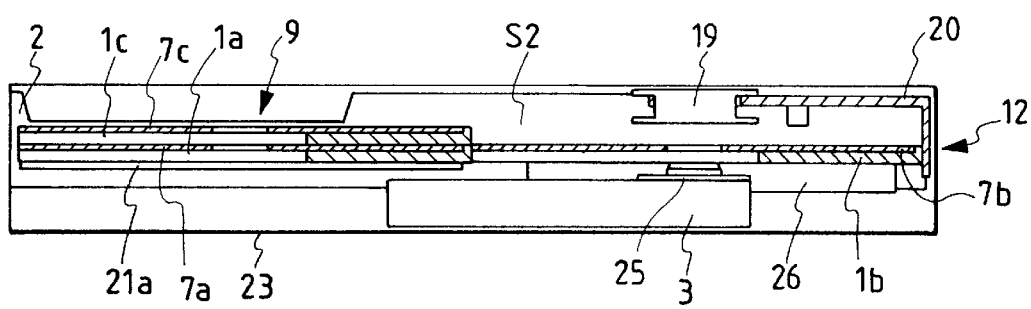
FIG. 11 is a sectional view showing another state of the disk changer in which the carriage which accommodates a selected disk has been moved into a spaced formed above the recording and reproducing unit.

When the player is started which has been in the play mode (FIG. 1), the first carriage 1a is lifted to the disk loading level 11 by the lifter 26, and receives the first disk 7a from the recording and reproducing unit 3 (of FIG. 20), and is lifted to the disk non-loading level 12 (of FIGS. 21, 2 and 3). The carriage 1a is further lifted by the carriage lifting mechanism 5 (of FIG. 22) to a level which is above the disk non-loading level 12 and is flush with the second carriage 1b (of FIG. 23). Thereafter, the lower carriage moving mechanism 6 is driven, so that the third carriage 1c is moved to the disk non-loading level 12 at the disk driving position 10 (of FIG. 24). The operations described with reference to FIGS. 22, 23 and 24 correspond to those described with reference to FIGS. 10, 9 and 8 in the stated order. Thereafter, the operations described with reference to FIGS. 7, 6, 5, 4 and 3 are carried out in the stated order, so that the positions of the disks 7a, 7b and 7c are exchanged one another, and by the operation of the disk setting mechanism 4 (FIG. 11–FIG. 12), the disk changer is placed in the state shown in FIG. 1 so that the third disk 7c in ready to be driven.

As is apparent from the above description, the replacement of the disk which is being reproduced; i.e., the disk at the disk loading level at the disk driving position 10 with the disk which is located on the upper stage at the disk accommodating position can be achieved most quickly when the carriages are turned clockwise; and on the other hand, the replacement of the disk at the disk loading level at the disk driving position 10 with the disk located on the lower stage at the disk accommodating position 9 can be achieved most quickly when the carriages are turned counterclockwise. Hence, if a program is so formed that the selection of the above-described quickest operation corresponds to the selection of the operating keys of the device, then a disk changer can be formed which is convenient in practical use and is high in disk change efficiency.

Now, a disk replacing operation will be described in which, while the reproduction of the disk being continued in the play mode shown in FIG. 1, the second and third disks 7b and 7c stored in the front of the device are taken out and replaced with other disks provided outside the device. For instance when an operation key [OPEN] (not shown) is depressed to open the tray 2, the motor is driven to pull out the tray 2 (of the part (A) of FIG. 13); that is, the tray 2 is fully opened (of the part (B) of FIG. 13). Now, the second disk 7b can be taken out and replaced with another one.

When, under this condition, an operating key [CLOSE] is depressed, the tray is retracted into the device; that is, the play mode of FIG. 1 is continuously effected.

On the other hand, in order to take out the third disk 7c, the operating key [OPEN] is depressed again, the pin gear 15 of the upper carriage moving mechanism 6 is turned, so that the second carriage 1b is moved on the star gear 31 located in the inner part of the device (of the part (A) of FIG. 14). In this operation, the second carriage 1b slides over the star gear 22 located in the front of the device and the star gear 31 located in the inner part of the device. Thus, the third disk 7c on the third carriage 1b can be taken out (of the part (B) of FIG. 14). When, under this condition, the operating key [CLOSE] is depressed, the pin gear 15 of the upper carriage moving mechanism 6 is turned in the opposite direction, so that the second carriage is moved towards the front of the device (of the part (A) of FIG. 14). Thus, the disk changer is placed in the state shown in the part (B) of FIG. 13.

Furthermore, by forming a program so that the replacement of the disk which is being reproduced at the disk driving position 10 with the disk stored at the disk accommodating position 9, and the replacement of the disk stored at the disk accommodating position 9 with another disk provided outside the device are suitably combined with each other, the disk which is being reproduced in the play mode of FIG. 1 can be readily replaced with another disk provided outside the device.

While one preferred embodiment of the invention has been described, the Invention is not limited thereto or thereby; that is, it will be obvious to those skilled in the art that various changes and modifications may be made therein without departing from the invention. For instance, in the above-described embodiment, three disks are replaced with one another; however, the invention is not limited thereto or thereby; that is, the technical concept of the invention may be applied to a disk changer which handles only two disks, or more than three disks.

While the embodiment has been described with reference to the CD; the invention is not limited thereto or thereby; that is, the technical concept of the invention may be applied to a disk changer in a device for reproducing CD-ROMs and other recording media.

As was described above, the space corresponding to one carriage is effectively utilized to move the carriage vertically and horizontally thereby to load a selected disk on the recording and reproducing unit. That is, in the disk changer, the space for replacement of a disk is minimized in volume. Furthermore, the carriages are stacked when stored, which minimizes the carriage storing space. Moreover, it is unnecessary for the disk changer to employ an intricate carriage supporting mechanism to maintain the flatness of the carriages and to prevent the warp or distortion of the latter, nor to increase the thickness of the carriages. Hence, the disk changer of the invention is compact, and low in manufacturing cost when compared with the conventional one.

The technical concept of the invention is most effectively applied especially to a disk changer which accommodates about three disks. In this case, the resultant disk changer is simplest in structure, lowest in manufacturing cost, and smallest in height; that is, the disk changer can be miniaturized as a whole.

In the disk changer of the inventions the recording and reproducing unit is arranged in the inner part of the device, and the carriages are stored on the side of the front of the device. Hence, during the data recording or reproducing operation of the disk, the latter can be replaced with any one of the disks thus stored.

What is claimed:

1. A disk changer comprising:
    a plurality of carriages for carrying a disk on each carriage;
    a tray accommodating the plurality of carriages, the tray being reciprocated between a disk take-out position and a disk accommodating position;
    a recording and reproducing unit for driving a disk at a disk driving position for recording data thereon and reproducing data therefrom;
    a disk setting mechanism for displacing the disk when the disk is at the disk driving position from a disk loading level to a disk non-loading level and vice versa;
    a carriage lifting mechanism for vertically moving the carriage, which is at the disk accommodating position, between the lowermost level thereof and a level above the lowermost level, and for vertically moving the carriage, which is at the disk driving position, between the non-loading level and a level above the non-loading level; and
    a carriage moving mechanism for moving the carriage to a space formed at one of the disk accommodating position and the disk driving position in association with an operation of the carriage lifting mechanism.

2. The disk changer as claimed in claim 1, wherein the disk accommodating position is located between the disk take-out position and the disk driving position, and wherein the plurality of carriages are laminately stacked at the disk accommodating position.

3. The disk changer as claimed in claim 2, wherein the disk non-loading level is flush with the lowermost level at the disk accommodating position.

4. The disk changer as claimed in claim 1, wherein when the tray is at the disk take-out position, one of the plurality of carriages is placed at the disk driving position.

5. The disk changer as claimed in claim 1, wherein when the tray is at the disk accommodating position, the space corresponding to at least one carriage is provided at one of the disk accommodating position and the disk driving position.

6. The disk changer as claimed in claim 2, wherein, when the tray is positioned at the disk take-out position, a plurality of the carriages laminately stacked in the tray are positioned at the disk take-out position so that the disks are applicable for being removed to outside and replaced by a disk not loaded in the disk changer.

7. A disk changer comprising:
    a plurality of carriages for carrying a disk on each carriage;
    a tray accommodating the plurality of carriages, the tray being reciprocated between a disk take-out position and a disk accommodating position;
    a recording and reproducing unit for driving a disk at a disk driving position for recording data thereon and reproducing data therefrom:
    a disk setting mechanism for displacing the disk when the disk is at the disk driving position from a disk loading level to a disk non-loading level and vice versa;
    a carriage lifting mechanism for vertically moving the carriage, which is at the disk accommodating position, between the lowermost level thereof and a level above the lowermost level, and for vertically moving the carriage, which is at the disk driving position, between the non-loading level and a level above the non-loading level; and
    a carriage moving mechanism for moving the carriage to a space formed at one of the disk accommodating position and the disk driving position in association with an operation of the carriage lifting mechanism,
    wherein the carriage moving mechanism includes:
        teeth protruding from a side of the carriage and arranged at predetermined intervals, each of the teeth having a flange at an end of each of the teeth; and
        a pin gear having pins extended substantially in parallel with a direction of protrusion of the teeth and engaging the teeth, each of the pins having a flange at an end of each pin, and
        wherein the flanges of the teeth and each flange of each of the pins of the pin gear prevent the teeth and the pins from unintentionally disengaging from each other.

8. The disk changer as claimed in claim 7, wherein each flange of each of the teeth and each flange of each pin has an abutment surface abutted against each other, and wherein the abutment surface is sloped such that each flange of each pin is gradually thinner towards an outer edge.

9. A disk changer comprising:
   a plurality of carriages for carrying a disk on each carriage;
   a tray accommodating the plurality of carriages, the tray being reciprocated between a disk take-out position and a disk accommodating position;
   a recording and reproducing unit for driving a disk at a disk driving position for recording data thereon and reproducing data therefrom;
   a disk setting mechanism for displacing the disk when the disk is at the disk driving position from a disk loading level to a disk non-loading level and vice versa,
   a carriage lifting mechanism for vertically moving the carriage, which is at the disk accommodating position, between the lowermost level thereof and a level above the lowermost level, and for vertically moving the carriage, which is at the disk driving position, between the non-loading level and a level above the non-loading level; and
   a carriage moving mechanism for moving the carriage to a space formed at one of the disk accommodating position and the disk driving position in association with an operation of the carriage lifting mechanism,
   wherein the disk changer has three carriages, the tray accommodates two of the three carriages and reciprocates between the disk take-out position and the disk accommodating position.

10. The disk changer as claimed in claim 9, wherein when the tray is at the disk take-out position, a remaining one carriage is placed at the disk driving position.

11. The disk changer as claimed in claim 9, wherein when the tray is at the disk accommodating position, a space corresponding to at least one carriage is provided at one of the disk accommodating position and the disk driving position.

12. The disk changer as claimed in claim 9, wherein, when the tray is positioned at the disk take-out position, the two carriages accommodated in the tray are positioned at the disk take-out position so that the disks on the two carriages are applicable for being removed to outside and replaced by a disk not loaded in the disk changer.

13. A method for changing the disk in a disk changer including a tray accommodating a plurality of carriages, on each of which a disk is placed, the tray being reciprocated between a disk take-out position and a disk accommodating position, and a recording and reproducing unit for driving a disk at a disk driving position opposite to the disk take-out position with respect to the disk accommodating position, comprising the steps of:
   laminately stacking the plurality of carriages in the disk accommodating position, and loading a first disk onto the recording and reproducing unit;
   selecting a second disk, to be replaced by the first disk, from disks placed on the plurality of carriages laminately stacked in the disk accommodating position;
   unloading the first disk from the recording and reproducing unit, placing the first disk onto a first carriage, and moving the first carriage into a plane flush with one of the carriages laminately stacked in the disk accommodating position;
   horizontally moving a second carriage, on which the second disk is placed, to the disk driving position so as to provide a space corresponding to one carriage at the disk accommodating position;
   vertically displacing the space until the space being in the plane flush with the first carriage by vertically succeedingly moving the other carriage laminately stacked in the disk accommodating position;
   horizontally moving the first carriage to the space to accommodate it into the disk accommodating position when the space reaches the plane flush with the first disk; and
   moving the second carriage positioned at the disk driving position toward the recording and reproducing unit to load the second disk on the recording and reproducing unit.

14. A method for changing the disk in a disk changer including a tray accommodating a plurality of disks, the tray being reciprocated between a disk take-out position and a disk accommodating position, and a recording and reproducing unit for driving a disk at a disk driving position opposite to the disk take-out position with respect to the disk accommodating position, comprising the steps of:
   laminately stacking the plurality of disks in the disk accommodating position, and loading a first disk onto the recording and reproducing unit;
   selecting a second disk, to be replaces by the first disk, from disks laminately stacked in the disk accommodating position;
   unloading the first disk from the recording and reproducing unit, and moving the first disk into a plane flush with one of the disks laminately stacked in the disk accommodation position;
   horizontally moving the second disk to the disk driving position to provide a space corresponding to one disk at the disk accommodating position;
   vertically displacing the space until the space being in a plane flush with the first disk by vertically succeeding moving the other disks laminately stacked in the disk accommodating position;
   horizontally moving the first disk to the space to accommodate it into the disk accommodating position when the space reaches the plane flush with the first disk; and
   moving the second disk at the disk driving position toward the recording and reproducing unit to load the second disk on the recording and reproducing unit.

15. A method for changing the disk as claimed in claim 14, wherein, when the tray is positioned at the disk take-out position, a plurality of the disks laminately stacked in the tray are positioned at the disk take-out position so that the disks may be replaced by a disk external to the disk changer.

16. The method for changing the disk as claimed in claim 14, wherein when the second disk is positioned below the plane flush with the first disk, the other disks laminately stacked in the disk accommodating position are succeedingly moved down so as to displace upward the space, and when second disk is positioned above the plane flush with the first disk, the other disks laminately placed in the disk accommodating position are succeedingly moved up so as to displace downward the space.

17. A disk changer comprising:
   a plurality of carriages having a disk on each carriage;
   a tray accommodating the plurality of carriages, the tray being reciprocated between a disk take-out position and a disk accommodating position;

a recording and reproducing unit for driving a disk at a disk driving position for recording data thereon and reproducing data therefrom;

a disk setting mechanism for displacing the disk when the disk is at the disk driving position from a disk loading level to a disk non-loading level and vice versa;

a carriage lifting mechanism for vertically moving the carriage, which is at the disk accommodating position, between the lowermost level thereof and a level above the lowermost level, and for vertically moving the carriage, which is at the disk driving position, between the non-loading level and a level above the non-loading level; and a carriage moving mechanism for moving the carriage to a space formed at one of the disk accommodating position and the disk driving position in association with an operation of the carriage lifting mechanism, wherein the carriage moving mechanism and the carriage lifting mechanism are located in the tray.

* * * * *